United States Patent
Oishi et al.

(10) Patent No.: US 8,525,445 B2
(45) Date of Patent: Sep. 3, 2013

(54) VEHICLE LIGHT CONTROLLER

(75) Inventors: Tatsuo Oishi, Hamamatsu (JP); Tomoyuki Ohata, Tokyo (JP)

(73) Assignees: Niles Co., Ltd., Tokyo (JP); Suzuki Motor Corporation, Shizuoka (JP)

( * ) Notice: Subject to any disclaimer, the term of this patent is extended or adjusted under 35 U.S.C. 154(b) by 612 days.

(21) Appl. No.: 12/783,338

(22) Filed: May 19, 2010

(65) Prior Publication Data

US 2010/0295450 A1 Nov. 25, 2010

(30) Foreign Application Priority Data

May 21, 2009 (JP) .................. 2009-123407

(51) Int. Cl.
*H05B 41/36* (2006.01)

(52) U.S. Cl.
USPC ............. 315/308; 315/82; 315/291; 315/307; 315/209 R

(58) Field of Classification Search
USPC ............. 315/186, 192, 193, 209 R, 210, 225, 315/226, 291, 294, 297, 299, 307, 308, 312, 315/313, 315, 320, 361, 362, 82, 77
See application file for complete search history.

(56) References Cited

U.S. PATENT DOCUMENTS

2005/0157509 A1 * 7/2005 Tsukamoto ............... 362/465

FOREIGN PATENT DOCUMENTS

JP 2005-199974 7/2005

* cited by examiner

*Primary Examiner* — Douglas W Owens
*Assistant Examiner* — Jianzi Chen
(74) *Attorney, Agent, or Firm* — Roylance, Abrams, Berdo & Goodman, LLP

(57) ABSTRACT

A first light on/off check portion 3 checks the on/off of a light depending on the brightness, and a second light on/off check portion 9 checks the on/off of the light depending on the rain. A light control portion 10, when the rain-dependent on/off check shows the turn-on of the light, turns on a head lamp to avoid the visibility difficulty caused by the rain and, when the rain-dependent on/off check shows the turn-off of the light, according to the result of the check of the brightness-dependent on/off of the light, controls the head lamp and small lamp. A running scene check portion 8 checks the states of the inside and outside of a tunnel, and the second light on/off check portion 9, when the rain-dependent on/off check shows the turn-on of the light, continues the turn-on of the light on/off check for a given time.

8 Claims, 10 Drawing Sheets

FIG. 2

| RAIN STATE | DRIVE MODE | |
|---|---|---|
| HEAVY ↕ LIGHT | CONSECUTIVE | HIGH |
| | | LOW |
| | INT | 0.6 SEC INTERVAL |
| | | 1.5 SEC INTERVAL |
| | | 3.0 SEC INTERVAL |
| | | 5.0 SEC INTERVAL |
| | | 10.0 SEC INTERVAL |
| | WIPING STOP | |

FIG. 5

| RAIN-DEPENDENT ON/OFF CHECK | BRIGHTNESS-DEPENDENT ON/OFF CHECK | LIGHT CONTROL SIGNAL |
|---|---|---|
| ON | OFF | HEAD LAMP TURN-ON |
| | SMALL LAMP TURN-ON | HEAD LAMP TURN-ON |
| | HEAD LAMP TURN-ON | HEAD LAMP TURN-ON |
| OFF | OFF | OFF |
| | SMALL LAMP TURN-ON | SMALL LAMP TURN-ON |
| | HEAD LAMP TURN-ON | HEAD LAMP TURN-ON |

VEHICLE LIGHT CONTROLLER

CROSS-REFERENCE TO RELATED APPLICATION

This application is based on and claims priority under 35 U.S.C. §119 from Japanese Patent Application No. 2009-123407 filed on May 21, 2009.

BACKGROUND

1. Technical Field

The present invention relates to a vehicle light controller which automatically turns on a vehicle light according to the state of a rainfall.

2. Description of the Related Art

While a driver is driving a vehicle, in the case that it happens to rain, there is a fear that the driving visibility of the driver can be lowered, or a fear that the recognition of the existence of this vehicle from other vehicles or pedestrians can be lowered. Thus, as the countermeasures against such fear, preferably, the light of vehicle may be turned on.

On the other hand, there has been already popularized an automatic light apparatus which can automatically turn on and off the light of a vehicle according to the brightness of the running environment of a vehicle, that is, turns on the vehicle light when actual illumination is lowered than reference illumination since the vehicle enters a tunnel or the like, and turns off the light when the illumination becomes equal to or higher than the reference illumination.

Thus, in order to turn on the vehicle light automatically in the case of a rainfall as well, for example, in JP-A-2005-199974, there is proposed an apparatus which uses the fact that, in the rainfall, even though the illumination is not reduced down to the reference illumination of an ordinary automatic light apparatus, the illumination is lowered than the illumination in the case of non-rainfall, when raindrops are detected by a rain sensor, can switch the value of the reference illumination of the automatic light apparatus over to a higher value.

The disclosed apparatus aims at attaining the following object. That is, in the state of a rainfall in which the running environment becomes darker slightly, a vehicle light such as head lamps, small lamps, or room lamps are automatically turned on to thereby allow the enhancement of the driving visibility of the driver of own vehicle or to allow other vehicles and pedestrians to easily recognize the existence of own vehicle.

Here, according to the above-mentioned conventional apparatus, when, while the vehicle is running in a state where the vehicle light is on according to the rainfall, the vehicle comes into a rain block object such as a tunnel, the rain sensor determines that the rainfall is stopped.

When it is determined that the rainfall has been stopped, the reference illumination of the automatic light apparatus is returned to the normal low value. Thus, since the normal reference illumination is set according to which the light can be turned on within the tunnel, the turn-on state of the light is kept on while the vehicle is running within the tunnel even in the case that the rain sensor does not detect a rainfall.

However, in the case that the rainfall state remains still also in the exit of the tunnel, since the brightness in surround of the vehicle is higher than the normal reference illumination, immediately when the vehicle runs out from the tunnel, the automatic light apparatus turns off the light.

And, in the above-mentioned conventional automatic light apparatus, there is found the following problem: that is, during the time necessary from the time, when the rain sensor newly detects a raindrop, to the time when the apparatus determines that the vehicle environmental state is a rainfall state and thus switches the reference illumination, the driver has to drive the vehicle with the light turned off in a visibility difficult state and in other difficult states.

Further, the automatic light control, within the tunnel exit, must turn off the light which has been on within the tunnel, and next must turn on it again. This repetition of turn on and off of the light bothers the driver, and also can raise a possibility that such on/off repetition can embarrass the drivers of other vehicles running ahead and behind the vehicle wondering if such on/off repetition tells some intention.

Thus, the present invention aims at solving the problems found in the above-mentioned automatic light apparatus. Specifically, it is an object of the invention to provide a vehicle light controller which prevents the light of a vehicle turned on according to a rainfall from being turned off in the exit of a rain block object, thereby being able to maintain the driving visibility and the like at a proper level.

SUMMARY

According to a first aspect of the invention, there is provided a vehicle light controller, including:

a first light on/off check portion for checking the on/off of a light according to the brightness of the running environment of a vehicle;

a running scene check portion for checking whether a running position of the vehicle is within a rain block object or not;

a second light on/off check portion for checking the on/off of the light according to the state of a rainfall and a result of the check of the running scene check portion; and a light control portion for controlling the on/off of the light according to the result of the check of the first light on/off check portion and the result of the check of the second light on/off check portion, wherein the second light on/off check portion, when the result of the check thereof shows the turn-on of the light correspondingly to the rainfall state, maintains the turn-on check result for a given time after the vehicle goes out from the rain block object, and wherein the light control portion, when the result of the check of the second light on/off check portion shows the turn-off of the light, turns on and off the light according to the result of the check of the first light on/off check portion, and, when the result of the check of the second light on/off check portion shows the turn-on of the light, turns on the light according to the result of the check of the second light on/off check portion in preference to the result of the check of the first light on/off check portion.

According to a second aspect of the invention, there is provided the vehicle light controller as set forth in the first aspect, wherein the running scene check portion, when the result of the check of the first light on/off check portion shows the turn-on of the light, determines that the vehicle exists within the rain block object.

According to a third aspect of the invention, there is provided the vehicle light controller as set forth in the first or second aspect, wherein the running scene check portion, when a change ratio of illumination is a given ratio or higher, determines that the vehicle has entered the rain block object.

According to a fourth aspect of the invention, there is provided the vehicle light controller as set forth in any one of the first to third aspects, wherein the second light on/off check portion obtains the rainfall state from the operation state of a wiper.

According to a fifth aspect of the invention, there is provided the vehicle light controller as set forth in the fourth aspect, wherein the second light on/off check portion, when the number of times of wiping operations of the wiper for a given time provides a given value or larger, determines that the check result shows such rainfall state that requires turning on the light.

According to a sixth aspect of the invention, there is provided the vehicle light controller as set forth in any one of the first to fifth aspects, wherein the given time for maintaining the turn-on check in the second light on/off check portion is a time necessary for a wiping stop time of the wiper to exceed a turn-off prohibition time to be set according to an elapsed time after the vehicle goes out from the rain block object.

According to a seventh aspect of the invention, there is provided the vehicle light controller as set forth in the fourth aspect, wherein the second light on/off check portion, when a drive mode of the wiper is a given high speed side mode, determines that the check result shows such rainfall state that requires turning on the light.

According to an eighth aspect of the invention, there is provided the vehicle light controller as set forth in the seventh aspect, wherein the given time for maintaining the turn-on check in the second light on/off check portion is a time necessary for the drive mode of the wiper to become a low speed side mode equal to or lower than a turn-off prohibition mode to be set according to the elapsed time after the vehicle goes out from the rain block object.

BRIEF DESCRIPTION OF THE DRAWINGS

A general architecture that implements the various features of the invention will now be described with reference to the drawings. The drawings and the associated descriptions are provided to illustrate embodiments of the invention and not limited the scope of the invention.

FIG. 2 is a view to show a wiper drive mode;

FIG. 5 is a view to show an example of light on/off control to be executed by a light control portion;

DETAILED DESCRIPTION

Figure 1:
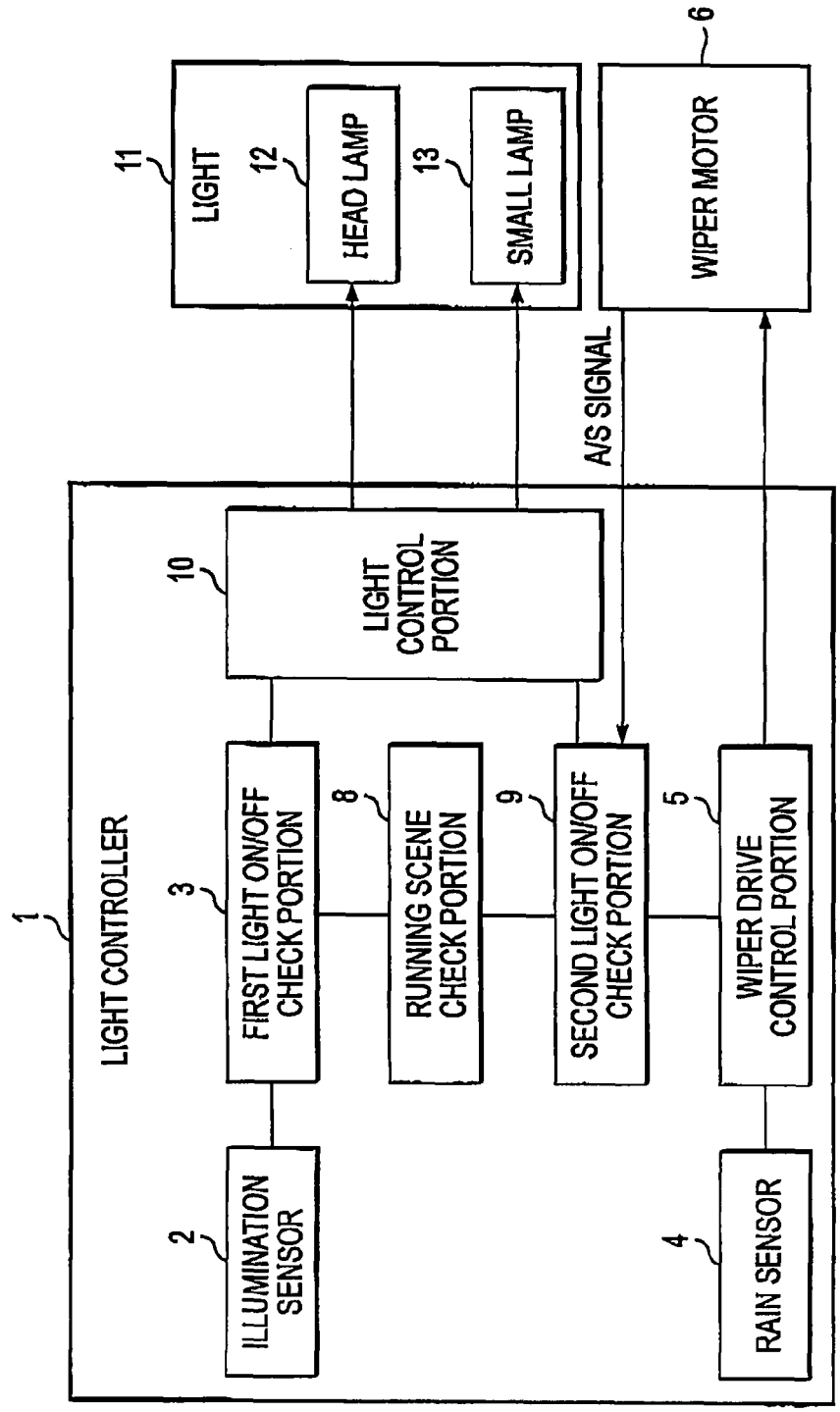
FIG. 1 is a block diagram of the structure of a first embodiment according to the invention.

Various embodiments according to the invention will be described hereinafter with reference to the accompanying drawings.

Now, description will be given below specifically of the mode for carrying out the invention with reference to the embodiments according to the invention.

Embodiment 1

Fig. is a block diagram of the structure of a light controller according to a first embodiment of the invention.

The light controller 1, firstly, includes a first light on/off check portion 3 to which an illumination sensor 2 for detecting the brightness of the outside of the vehicle is connected, and a wiper drive control portion 5 to which a rain sensor is connected and also which drives a wiper 6.

The light controller further includes a running scene check portion 8 connected to the first light on/off check portion 3, a second light on/off check portion 9 connected to the wiper drive control portion 5 and running scene check portion 8, and a light control portion 10 connected to the first light on/off check portion 3 and second light on/off check portion 9.

The illumination sensor 2 may be set at any position, provided that it allows the illumination sensor 2 to direct its detecting direction toward the outside of the vehicle to thereby detect the brightness of the vehicle.

The first light on/off check portion 3 checks, according to the result of comparison of the brightness of the outside of the vehicle with the reference illumination, whether a light 11 (headlamps 12, small lamps 13) should be turned on and off according to the illumination, and outputs its check result to the light control portion 10. This check result is hereinafter referred to as "brightness-dependent on/off check" as well.

The rain sensor 4 detects the state of a rainfall according to the state of adhesion of rain drops to the front windshield (which is hereinafter referred to as a windshield) of the vehicle and outputs the detected rainfall state to the wiper drive control portion 5.

The wiper drive control portion 5 decides the drive mode of the wiper according to the rainfall state detected by and sent from the rain sensor 4 and, according to the decided drive mode, outputs a drive signal to the wiper 6. For example, as shown in FIG. 2, the wiper drive control portion 5, in correspondence to the states of rainfalls including a little rainfall state to a heavy rainfall state, selects one from among a wiping stop drive mode, an INT drive mode including multiple stages for intermittent wiping operations having a rest time ranging from 10.0 sec. to 0.6 sec., a low-speed continuous wiping drive mode LOW and a high-speed continuous wiping drive mode HIGH, and drives the wiper 6 at multiple-stage operation speeds. That is, as the drive mode moves sequentially from the TNT mode of 10.0 sec., through the INT mode of 0.6 sec. and the LOW mode to the HIGH mode, the operation speed of the wiper 6 is increased accordingly.

The drive mode, which is decided by the wiper drive control portion 5, is read into the second on/off check portion 9. Also, to the second light on/off check portion 9, there is input an A/S signal from the wiper 6, whereby there is obtained information as to whether the wiper 6 is held at its initial position or at its operation position (wiping position). The second light on/off check portion 9 checks according to the drive mode whether the wiper 6 is operating at a given operation speed or not, and also, according to the A/S signal, finds the number of times of wiping operations and the state of a wiping operation which reciprocates between the initial position of the wiper and the turning position thereof.

The running scene check portion 8 checks according to the output of the first light on/off check portion 3 whether, as a rain block object, the current running position of the vehicle exists within a tunnel or not, and outputs the check result to the second light on/off check portion 9.

The second light on/off portion 9 checks, according to the wiping operation state of the wiper 6, the running scene and the like, whether the on/off of the light 11 is necessary or not from the viewpoint of the state of the rainfall, and outputs the check result to the light control portion 10. In the following description, this check result is referred to as the "rain-dependent on/off check".

The second light on/off check portion 9 includes, in the inside thereof, counters such as a counter for counting the number of times of wiping operations, a counter for counting the wiping stop time, and a counter for counting the after-tunnel-passage elapsed time.

The light control portion 10 outputs light control signals to the head lamp 12, small lamp 13 and the like according to the check result provided by the first light on/off check portion 3 and the check result provided by the second light on/off check portion 9.

Here, the structure, in which the wiper drive control portion 5 drives the wiper 6 according to the output of the rain sensor 4, is the same as a conventionally known automatic wiper.

Also, the structure, in which the first light on/off check portion 3 checks according to the output of the illumination sensor 2 whether the on/off of the head lamp 12 small lamp 13 and the like is necessary or not, is the same as a conventionally known automatic light.

Figure 3:
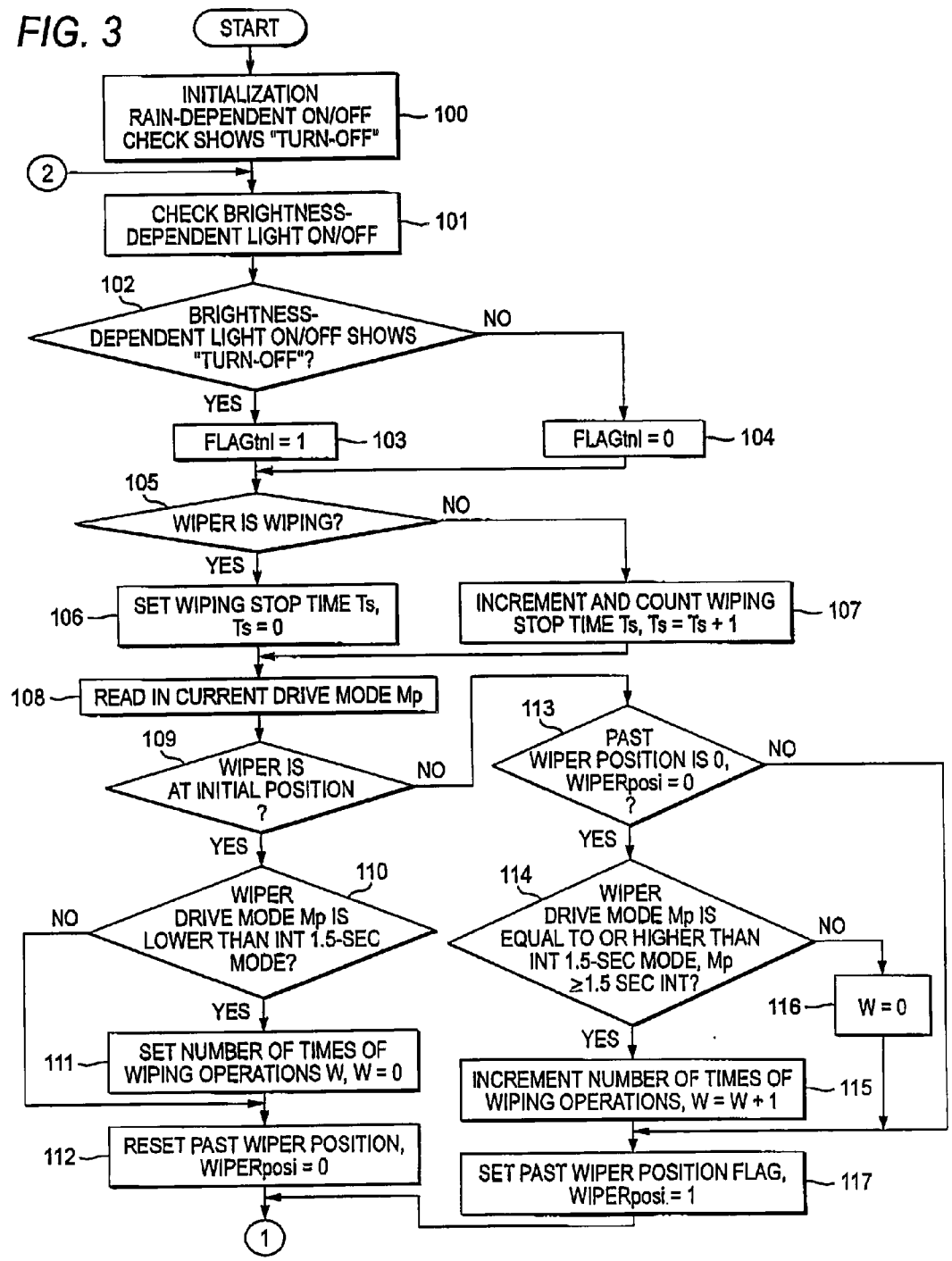
FIG. 3 is a flow chart of the flow of control to be carried out according to the first embodiment.
Figure 4:
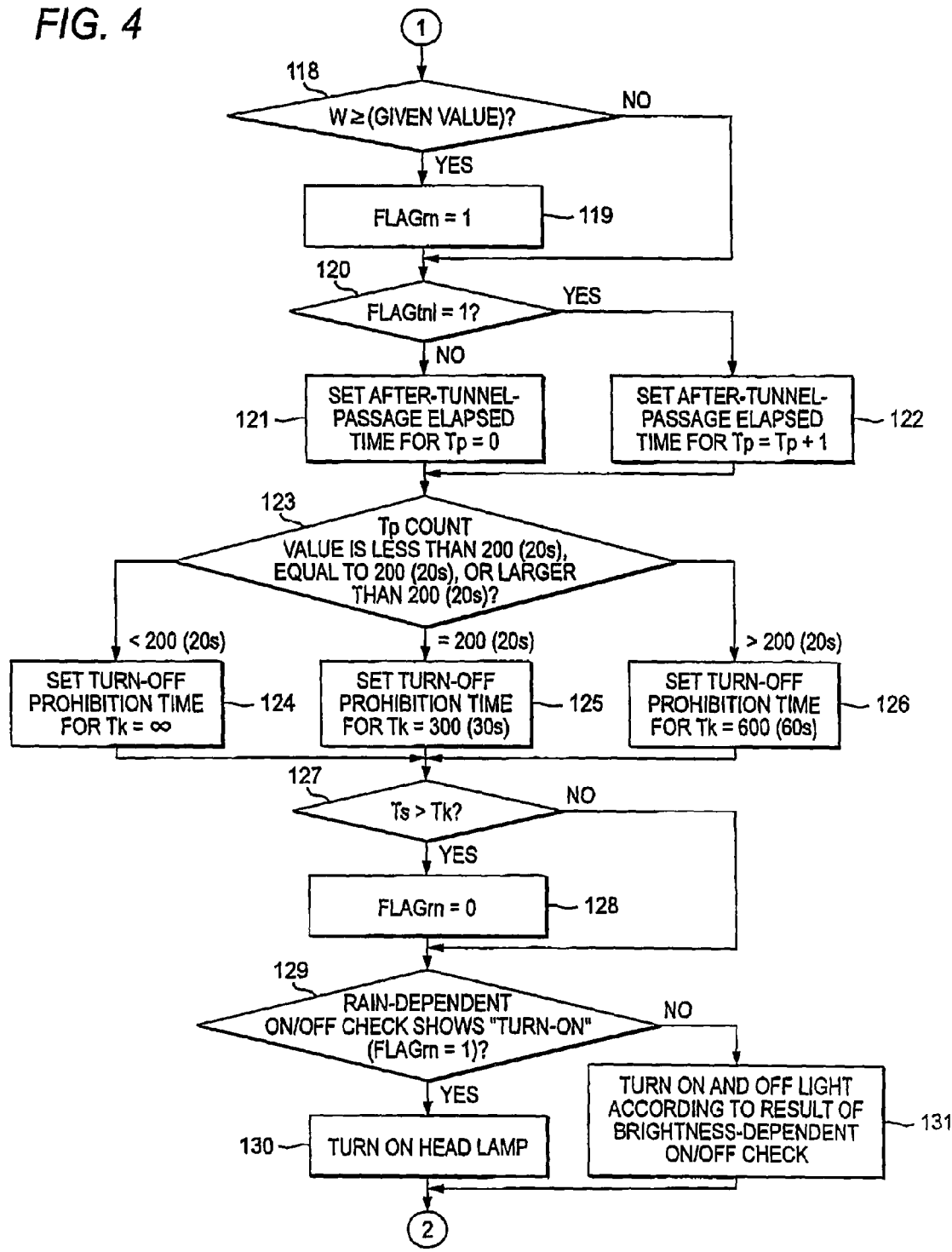
FIG. 4 is a flow chart of the flow of control to be carried out according to the first embodiment.

Next, description will be given below of the operation of the above-structured light controller 1. FIGS. 3 and 4 are respectively flow charts of the flow of the control.

This control flow is started when an ignition switch (not shown) provided in the vehicle is turned on and is repeated at given time intervals, for example, at every 100 m sec.

Here, the check for the necessity of the light on/off by the first light on/off check portion 3 is always carried out under another separate control, while the check result is read out in every necessary step.

Firstly, in Step 100, as initialization, the second light on/off check portion 9 determines that the rain-dependent on/off check shows "turn-off".

Also, the count values of the wiping stop time Ts and the after-tunnel-passage elapsed time Tp are set for 0 respectively; and, the tunnel flag FLAGtn1, rain-dependent on/off flag FLAGrn and past wiper position flag WIPERposi are reset respectively.

In Step 101, the running scene check portion 8 and light control portion 10 read therein the result of the check for the necessity of on/off (the brightness-dependent on/off check) of the light 11 based on the output of the illumination sensor 2 from the first light on/off check portion 3.

Here, the first light on/off check portion 3 determines that, when the illumination is higher than the first reference illumination corresponding to the twilight time, all lamps should be turned off, when the illumination becomes equal or lower than the first reference illumination, the small lamp 13 should be turned on, and further, when the illumination becomes equal to or lower than the second reference illumination corresponding to the night and lower than the first reference illumination, the head lamp 12 should be turned on.

When the vehicle runs into the tunnel, it is determined that the small lamp 12 or head lamp 13 should be turned on.

In Step 102, the running scene check portion 8 checks whether the brightness-dependent on/off check result of the first light on/off check portion 3 read in Step 101 shows "turn-off" or not.

When the brightness-dependent on/off check result shows "turn-off", in Step 103, the running scene check portion 8 determines that the vehicle is running outside the tunnel, and sets a tunnel flag (FLAGtn1=1).

When the brightness-dependent on/off check shows other result than "turn-off", that is, when it shows the turn-on of the small lamp or the turn-on of the head lamp, in Step 104, the running scene check portion 8 determines that the vehicle is running within the tunnel, and resets the tunnel flag (FLAGtn1=0).

After execution of Step 103 or 104, in Step 105, the second light on/off check portion 9 checks according to the A/S signal whether the wiper 6 is wiping, that is, the wiper 6 is held at its operation position, in other words, it is in the reciprocating process or not.

When it is found that the wiper 6 is wiping, in Step 106, the wiping stop time Ts, which is the stop continuing time after the wiper 6 stops at the initial position, is set for 0 (sec). When the wiper 6 is found not wiping, in Step 107, the wiping stop time Ts is counted by increment.

Here, in the case that the repetition interval of the control flow is 100 m sec., when the time Ts is incremented in each flow, 1/10 of the accumulated value provides the number of seconds.

Also, instead of the increment in each flow, there can also be used a timer counter.

After execution of Step 106 or 107, in Step 108, the second light on/off check portion 9 reads therein a current drive mode Mp from the wiper drive control portion 5.

The following steps from 109 to 111 and from 113 to 116 are processes respectively for counting the numbers of times of continuing wiping operations, in which, at a timing when the wiper 6 turns from the initial position to the operation position, the second light on/off check portion 9 confirms that the wiper 6 is wiping in a mode equal to or more than the reference 1.5 sec INT and counts the number of times of wiping operations.

Firstly, in Step 109, it is checked whether the wiper 6 is held at the initial position or not. Here, when the check result of Step 105 shows that the wiper 6 is not wiping, the wiper 6 is considered to be at the initial position.

When the wiper 6 is at the initial position, the processing goes to Step 110, where the second light on/off check portion 9 checks whether the current drive mode Mp obtained in Step 108 is a mode lower than 1.5 sec INT or not.

When the drive mode Mp is lower in speed than 1.5 sec INT, in Step 111, the number of times of wiping operations is set for 0 (zero), and then the processing goes to Step 112.

When the drive mode Mp is higher in speed than 1.5 sec INT, in Step 111, the processing goes directly to Step 112.

In Step 112, the second light on/off check portion 9 resets the past wiper position flag (WIPERposi=0). This is to store the fact that the current wiper position has been at the initial position.

On the other hand, in Step 109, when it is found that the wiper 6 is not at the initial position, that is, when it is at the operation position, the processing goes to Step 113, where the second light on/off check portion 9 checks whether the past wiper position flag WIPERposi showing the previous position is 0 or not.

In the case of WIPERposi=0, the current timing is a timing at which the wiper 6 is turned from the initial position to the operation position. Therefore, the second light on/off check portion 9, in Step 114, checks whether the current drive mode Mp is a high-speed side mode of 1.5 sec INT or higher or not. For 1.5 sec INT or higher, in Step 115, the number of times of wiping operations W is incremented.

Even in the case that the current timing is a timing at which the wiper 6 is turned from the initial position to the operation position, unless the drive mode Mp is 1.5 sec INT or higher, in Step 116, the number of times of wiping operations W is set for 0 (zero).

After execution of Step 115 or 116, in Step 117, the second light on/off check portion 9 sets the past wiper position flag (WIPERposi=1) in preparation for the next flow because the current position is the operation position.

Further, also when the wiper past position flag is found "on" from the check in Step 113 (WIPERposi=0), in Step 117, there is newly set the past wiper position flag in preparation for the next flow.

In the above-mentioned manner, in the case that the wiper operates at the drive mode of the reference speed, 1.5 sec INT or higher, the succeeding numbers of times of wiping operations are counted.

After execution of Step 112 or 117, the processing goes to Step 118.

In Step 118, the second light on/off check portion 9 checks whether the number of times of wiping operations W is a given number or larger, for example, 5 or larger or not.

When the number of times of wiping operations W is equal to or larger than a given value, in Step 119, there is set a rain-dependent on flag (FLAGrn=1) and then the processing goes to Step 120. To set the rain-dependent on flag serves as the base on which the result of the rain-dependent on/off check is determined to be on in the later stage.

When the number of times of wiping operations W is less than a given value, while holding the rain-dependent on/off flag in the previous flow, the processing goes to Step 120.

In the next step 120, the second light on/off check portion 9 checks the running scene according to the tunnel flag.

For FLAGtn1=0, that is, in the case that the running scene is within the tunnel, the second light on/off check portion 9, in Step 121, sets the after-tunnel-passage elapsed time Tp for 0 (zero) seconds. For FLAGtn1=1, that is, in the case that the running scene is outside the tunnel, the second light on/off check portion 9, in Step 122, increments the after-tunnel-passage elapsed time Tp.

Here, similarly to the wiping stop time Ts, 1/10 of the incremented and accumulated value is obtained as the number of seconds.

Also, in an ordinary state where the vehicle starts to run outside the tunnel, the count of the after-tunnel-passage elapsed time Tp is started at the time when the ignition switch is switched on. Also, when the vehicle comes out from the tunnel, since the after-tunnel-passage elapsed time Tp is reset to 0 within the tunnel, the count thereof is started at the time when the vehicle comes out from the tunnel.

After execution of Step 121 or 122, in Step 123, the second light on/off check portion 9 checks the count value of the after-tunnel-passage elapsed time Tp.

When the after-tunnel-passage elapsed time Tp is less than 20 sec (increment-dependent accumulated value 200), the processing goes to Step 124, when the time Tp reaches 20 sec, the processing goes to Step 125, and when the time Tp exceeds 20 sec, the processing goes to Step 126.

The reason why 20 sec is used as the comparison reference is to check whether, within passage of 20 sec after the vehicle runs out from the tunnel, the wiper is driven due to the rainfall or not. In the case that the light has been turned on due to the rainfall before the vehicle goes into the tunnel, by checking whether the rainfall continues or not, the on state of the head lamp can be continued without intermittence.

The second light on/off check portion 9, in Step 124, sets the turn-off prohibition time Tk for an infinite value, in Step 125, sets the turn-off prohibition time Tk for 30 sec, and, in Step 126, sets the turn-off prohibition time Tk for 60 sec.

The turn-off prohibition time Tk means that, during the time Tk, when the rain-dependent turn-off check time, that is, the wiping stop time measured in Step 107 exceeds the turn-off prohibition time, the rainfall has been stopped.

After any turn-off prohibition time Tk is set in Steps 124, 125 and 126, the processing goes to Step 127.

In Step 127, the second light on/off check portion 9 checks whether the wiping stop time Ts of the wiper 6 counted in the previous step 107 is larger than the turn-off prohibition time Tk or not.

While the wiping stop time Ts is equal to or less than the turn-off prohibition time Tk, the processing goes to Step 129.

When the wiping stop time Ts is larger than the turn-off prohibition time Tk, the processing goes to Step 128, where, after the second light on/off check portion 9 resets the rain-dependent turn-on flag (FLAGrn=0), it goes to Step 129.

In Step 129, according to the rain-dependent on/off check result provided by the second light on/off check portion 9, the light control portion 10 checks the rain-dependent turn-on flag.

In the case that FLAGrn=1 is found, the rain-dependent on/off check shows that the light should be turned on. Thus, in Step 130, the light control portion 10 outputs a light control signal indicating that all head lamps should be turned on regardless of the result of the brightness-dependent on/off check made by the first light on/off check portion 3. The small lamp 13 may also be turned on.

As a result of this, even when the brightness-dependent on/off check shows that it is not necessary to turn on the light, in a situation where the driving visibility or the like is lowered due to a given rainfall state, the head lamp 12 is turned on automatically. This facilitates the driving of the vehicle and also the vehicle can be easily recognized by other vehicles and pedestrians.

After then, the processing goes back to Step 101.

When the check in Step 129 shows that FLAGrn=0, it is determined that the rain-dependent on/off check shows "turn-off". Thus, in Step 131, according to the result of the check by the first light on/off check portion 3, the light control portion 10 outputs a light control signal indicating that, as shown in FIG. 5, when the result of the brightness-depending on/off check by the first light on/off check portion 3 shows "turn-off", all lamps should be turned off, when the check result shows the turn-on of the small lamp, the small lamp should be turned on, and when the check result shows the turn-on of the head-lamp, the head lamp 12 should be turned on. When the head lamp 12 is turned on, in linking with this, the small lamp 13 may also be turned on.

After then, the processing goes back to Step 101.

In the above-mentioned flow, according to Steps 109~118, when the wiper 6 repeats a relatively fast wiping operation, for example, when the wiper 6 repeats the wiping operation five times or more, it is determined that it rains so hard as to lower the driving visibility and the like, and thus there is set the rain-dependent turn-on flag FLAGrn. While the vehicle does not enter the tunnel but is running in the rainfall, the wiping stop time Ts to be counted and cleared in Step 106 is shorter than any turn-off prohibition time Tk regardless of the after-tunnel-passage elapsed time Tp to be counted in Step 122, so that the rain-dependent on/off check result shows "turn-on" according to FLAGrn=1. As a result of this, the processing goes from Step 127 to Step 129 and then to Step 130, and the light control portion 10 turns on the head lamp 12.

In the case that the vehicle is running with the head lamp 12 on, while the vehicle is running within the tunnel, according to Steps 120 and 121, the after-tunnel-passage elapsed time Tp is maintained at 0 sec and, according to Step 124, the turn-off prohibition time Tk is set such that Tk=∞. Therefore, as in the above-mentioned case, the rain-dependent on/off check result "turn-on" is maintained, whereby the turn-on of the head lamp 12 is continued. Accordingly, there is no possibility that the head lamp 12 can be suddenly turned off within the tunnel and the small lamp can be turned on instead to thereby embarrass the driver.

When the vehicle runs from within the tunnel to outside the tunnel, according to the count of the after-tunnel-passage elapsed time Tp in Step 122, the turn-off prohibition time Tk is set in Steps 124~126.

And, in Step 127, the wiping stop time Ts just before is compared with the turn-off prohibition time Tk. When the wiping stop time Ts becomes larger than the turn-off prohibition time Tk, the rain-dependent flag FLAGrn is reset to 0 in Step 128, with the result that the result of the rain-dependent on/off check result is determined to show "turn-off". Thus, the processing goes from Step 129 to Step 131, where the light control portion 10 turns on and off the light such as the head lamp 12 or small lamp 13 according to the result of the brightness-dependent on/off check.

Here, since, when the after-tunnel-passage elapsed time Tp is less than 20 sec, the turn-off prohibition time Tk is set for an infinite value, until the time reaches 20 sec after the vehicle goes out from the tunnel, the rain-dependent turn-on flag FLAGrn=1 is maintained and the processing goes from Step 127 directly to Step 129, where the rain-dependent on/off check is maintained in "turn-on" and the turn-on of the head lamp is continued.

The above-mentioned setting that, when the after-tunnel-passage elapsed time Tp reaches 20 sec, the turn-off prohibition time Tk is set for 30 sec means that, when no wiping operation is carried out within 30 sec in the past, the exit side of the tunnel can be determined not to be in a rainfall state and thus the head lamp may be turned off.

On the other hand, when the wiping operation is carried out within 30 sec and the wiping stop time Ts is equal to or shorter than the turn-off prohibition time Tk (=30 sec) (which can occur in the case that the tunnel is short), the result of the rain-dependent on/off check is determined not to show the "turn-off" of the light, and thus the turn-on of the head lamp 12 is continued.

In the case that the after-tunnel-passage elapsed time Tp exceeds 20 sec, the turn-off prohibition time Tk is set for 60 sec. The reason for this is that, when the after-tunnel-passage elapsed time Tp exceeds 20 sec, even in the case that the tunnel exit side is in a rainfall state, since there is newly obtained the rain-dependent on/off check result "turn-on" as described above, it is enough to be able to confirm that the wiping stop time extends to 60 sec.

When the wiping stop time is equal to or shorter than 60 sec, the processing goes from Step 127 directly to Step 129, where the rain-dependent turn-on flag FLAGrn=1 is maintained on and the turn-on of the head lamp is continued.

The first embodiment of the invention is structured in the above-mentioned manner. The first embodiment includes the first light on/off check portion 3 for carrying out the light on/off check according to the running environment, a running scene check portion 8 for checking whether the running position is within the tunnel or not, the second light on/off check portion 9 for carrying out the light on/off check according to the rain state and the check result of the running scene check portion 8, and the light control portion 10 for controlling the on/off of the light 11 (head lamp 12, small lamp 13) according to the check result of the first light on/off check portion 3 and the check result of the second light on/off check portion 9. The second light on/off check portion 9, when it determines that the on/off check result shows "turn-on" correspondingly to the rainfall, maintains the "turn-on" of the on/off check for a given time after the vehicle runs out from the tunnel. The light control portion 10, when the result of the on/off check of the second light on/off check portion 9 shows "turn-off", turns on and off the light 11 according to the check result of the first light on/off check portion 3. Also, the light control portion 10, when the result of the on/off check of the second light on/off check portion 9 shows "turn-on", turns on the head lamp 12 according to the check result of the second light on/off check portion 9 in preference to the check result of the first light on/off check portion 3.

Accordingly, when the vehicle enters the tunnel while the head lamp 12 is on, since the turn-on of the head lamp 12 is continued for a given time after the vehicle runs out from the tunnel, until rain drops are detected newly after the vehicle runs out from the tunnel and thus the head lamp 12 is turned on again, the occurrence of the difficult visibility and the like can be avoided.

The running scene check portion 8, especially, by using the check result of the first light on/off check portion 3, when the small lamp is on or the head lamp is on, determines that the vehicle is running within the tunnel. Thanks to this, when compared with a structure in which an exclusive check device is provided separately, the structure of the present embodiment can be simplified and can be realized at a low cost.

Also, the second light on/off check portion 9 obtains the rainfall state from the operation state of the wiper 6, which allows the rain sensor 4 to be used also as an automatic wiper, thereby being able to reduce the cost of the present structure. And, since, in the case that the number of times of wiping operations of the wiper 6 is equal to or larger than a given value, the environmental condition is determined as the rainfall state, the rainfall state requiring the turn-on of the light can be detected properly.

Also, a given time for maintaining the turn-on check in the second light on/off check portion 9 is set for the time necessary for the time when the wiping stop time Ts of the wiper 6 to exceed the turn-off prohibition time Tk which is set according to the elapsed time after the vehicle runs out from the tunnel. Therefore, by setting the turn-off prohibition time properly, for example, it is possible to prevent the rain-dependent on/off check from choosing "turn-off" just after the vehicle passes through a short tunnel in spite of the fact that the drive mode is in operation under the INT state.

Here, according to the present embodiment, in order that the result of the rain-dependent on/off check after the passage of the vehicle through and from the tunnel is prevented from absolutely showing "turn-off", the after-tunnel-passage elapsed time Tp with the turn-off prohibition time Tk set for an infinite value is set for 20 sec. However, this value can also be varied according to the speed of the vehicle.

That is, the rain sensor 4 detects the state of the rainfall according to the state of adhesion of rain drops to the windshield. Therefore, the rain Sensor 4 determines that the higher the vehicle speed is, the more the rain drop adhesion amount increases and thus the rain fall amount is large, so that the rain sensor 4 changes the driving speed of the wiper 6 up to the high speed. Accordingly, when it is raining on the exit side of the tunnel, the higher the vehicle speed is, the earlier the second light on/off check portion 9 determines the result of the rain-dependent on/off check to show "turn-on". This can reduce the after-tunnel-passage elapsed time Tp with the turn-off prohibition time Tk set for an infinite value. That is, when the tunnel exit side is not in a rainfall state, the light can be turned off quickly after the vehicle goes out of the tunnel.

Embodiment 2

Figure 6:
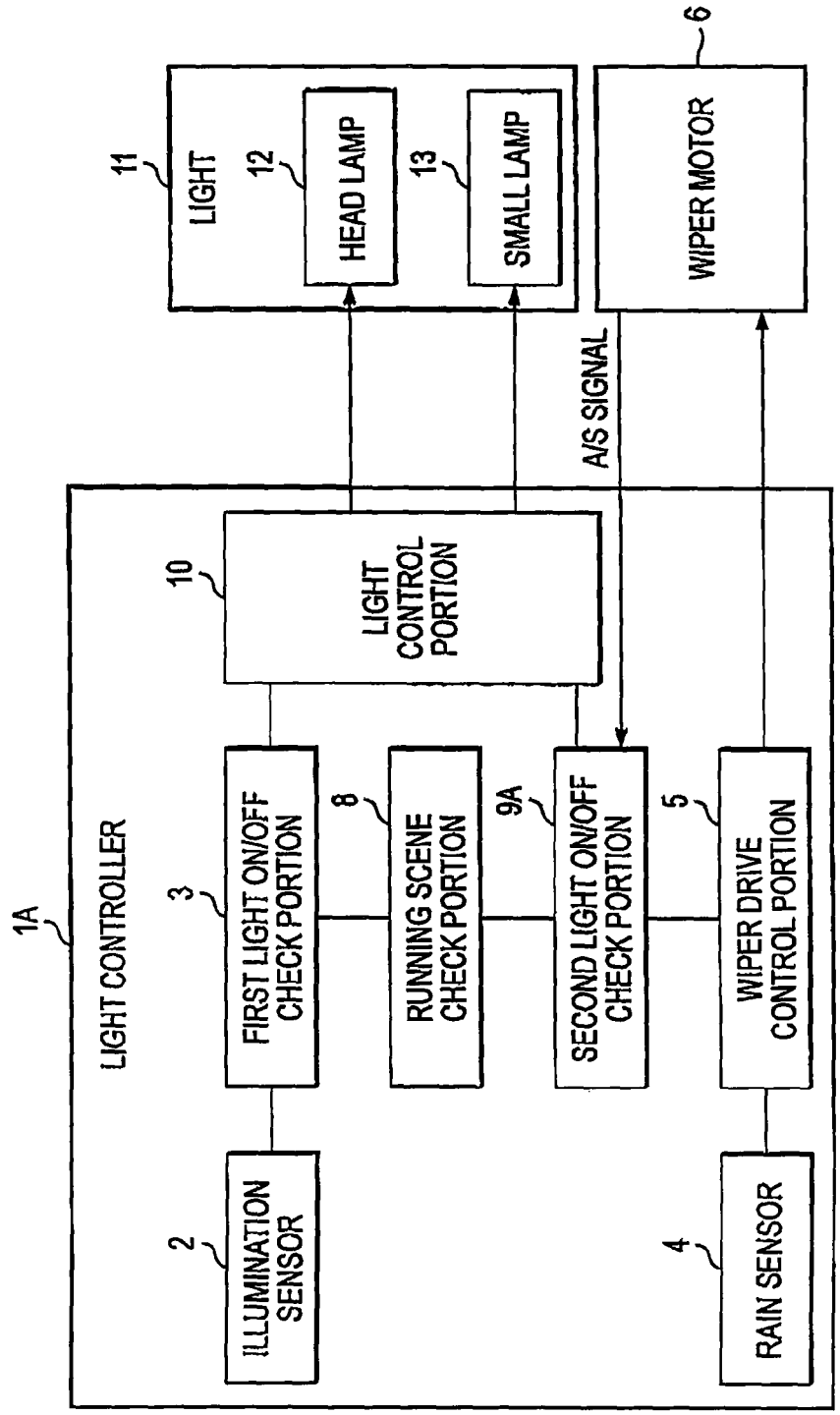
FIG. 6 is a block diagram of the structure of a second embodiment according to the invention.

FIG. 6 is a block diagram of the structure of a light controller according to a second embodiment of the invention.

The second embodiment, specifically, aims at turning on a head lamp only in the heavy rain.

A light controller 1A according to the second embodiment is different from the light controller 1 according to the first embodiment in that the function of a second light on/off check portion 9A is different from that of the second light on/off check portion 9.

The remaining portions of the second embodiment are the same as those of the first embodiment. Specifically, the light controller 1A includes an illumination sensor 2, a first light on/off check portion 3, a running scene check portion 8, a rain sensor 4, a wiper drive control portion 5, a light control portion 10 and so on.

The second light on/off check portion 9A carries out the rain-dependent on/off check according to the drive mode of the wiper 6 and the running scene of the vehicle and outputs the result of this check to the light control portion 10.

The second light on/off check portion 9A includes therein a counter for counting the number of times of wiping operations, a counter for counting the after-tunnel-passage elapsed time, and the like.

Figure 7:
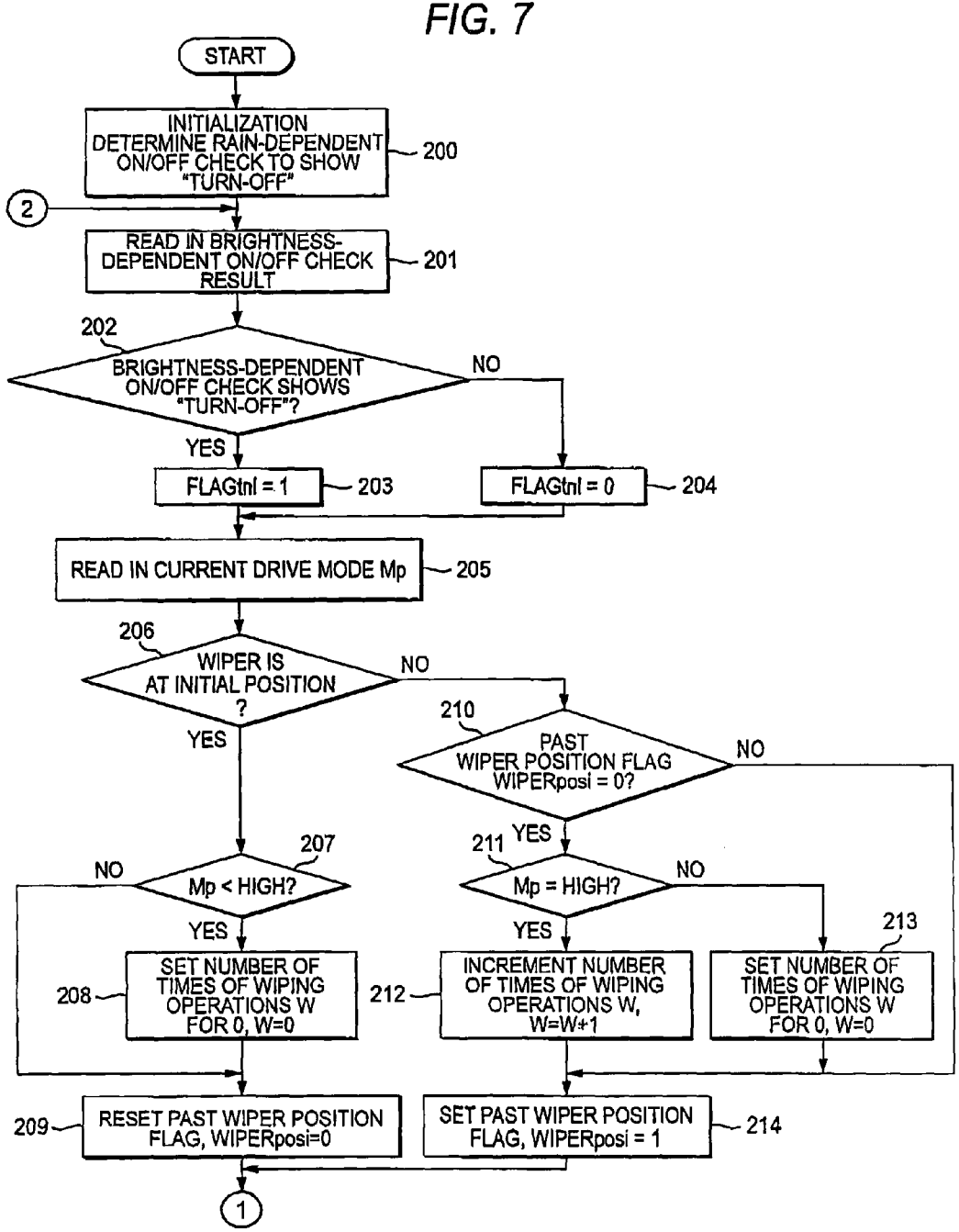
FIG. 7 is a flow chart of the flow of control to be carried out according to the second embodiment.
Figure 8:
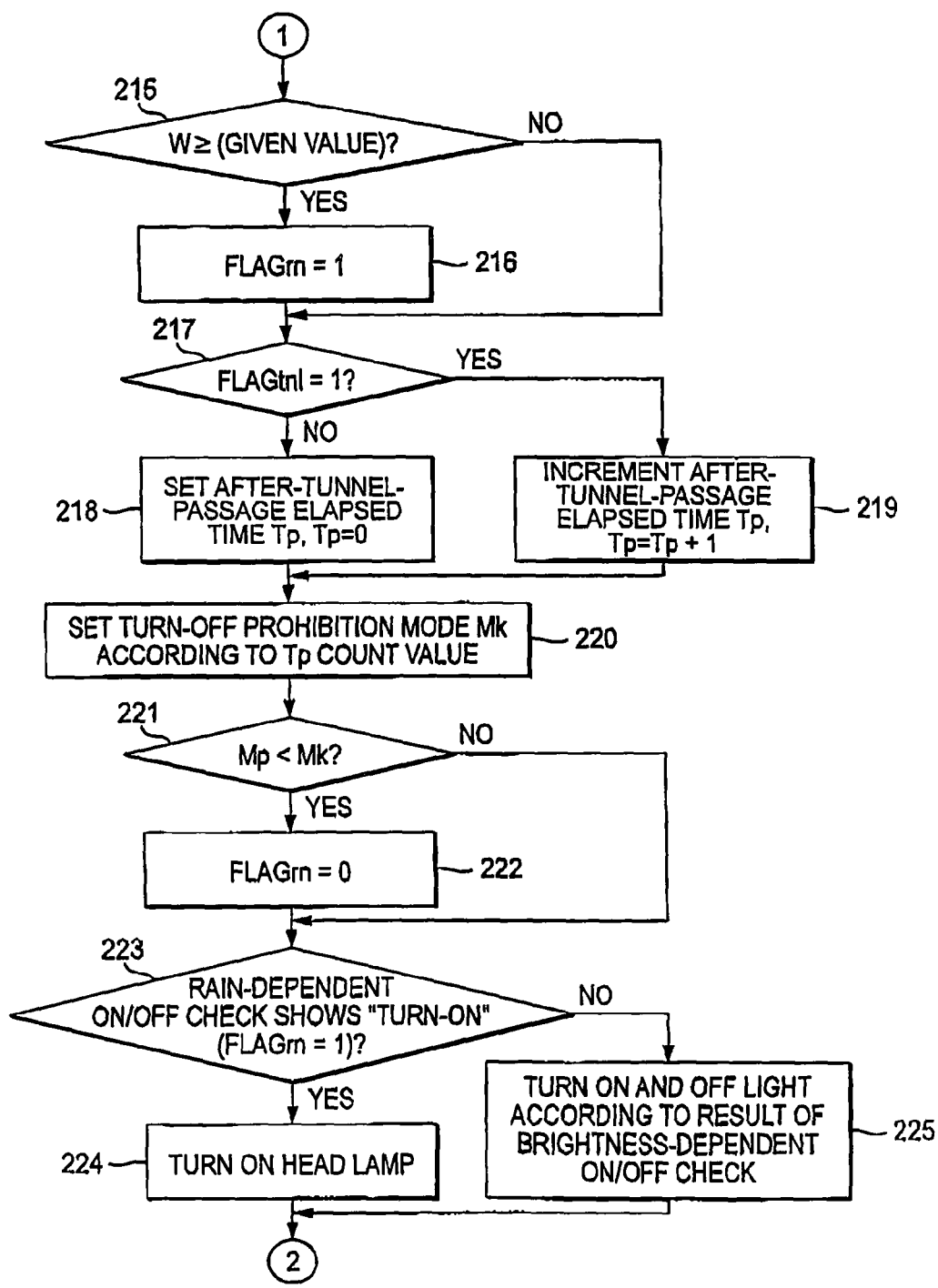
FIG. 8 is a flow chart of the flow of control to be carried out according to the second embodiment.

FIGS. 7 and 8 are respectively flow charts of the flow of control carried out in the second embodiment.

This control flow is started when the ignition switch of the vehicle is switched on and is repeated at given time intervals, for example, at every 100 msec.

Here, the check for necessity of turn-on of the light by the first light on/off check portion 3 is always executed under other separate control and, in a necessary given step, the result of this check can be read out.

Firstly, in Step 200, as initialization, the second light on/off check portion 9A determines that the rain-dependent on/off check shows "turn-off".

Together with this, the count value of an after-tunnel-passage elapsed time Tp is set for 0, a tunnel flag FLAGtn1, a rain-dependent turn-on flag FLAGrn, and a past wiper position flag WIPERposi are reset respectively.

In Step 201, the running scene check portion 8 and light control portion 10 respectively read therein from the first light on/off check portion 3 the result of the check for the necessity of the turn-on of the light 11 based on the output of the illumination sensor 2 (the result of the brightness-dependent on/off check).

Here, the first light on/off check portion 3, when the illumination is higher than a first reference illumination corresponding to the twilight time, determines that all lamps should be turned off, when the illumination is equal to or lower than the first reference illumination, determines that the small lamp 13 should be turned on and, when the illumination is equal to and lower than a second reference illumination lower than the first reference illumination and corresponding to the night, determines that the head lamp 12 should be turned on.

When the vehicle goes into a tunnel, it is determined that the small lamp 12 or head lamp 13 should be turned on.

In Step 202, the running scene check portion 8 checks whether the brightness-dependent on/off check of the first light on/off check portion 3 read therein in Step 201 shows "turn-off" or not.

When the brightness-dependent on/off check shows "turn-off", in Step 203, the running scene check portion 8 determines that the vehicle is running outside the tunnel, and sets a tunnel flag (FLAGtn1=1).

When the brightness-dependent on/off check shows other result than "turn-off", that is, the turn-on of small lamp or head lamp, in Step 204, the running scene check portion 8 determines that the vehicle is running within the tunnel, and resets the tunnel flag (FLAGtn1=0).

The foregoing processings are the same as those in Steps 100~104 according to the first embodiment.

After execution of Step 203 or 204, in Step 205, the second light on/off check portion 9A reads the current drive mode MP therein from the wiper drive control portion 5.

The following steps 206 to 208 and 210 to 213 are processings for counting the succeeding numbers of times of wiping operations, in which, at a timing where the wiper 6 moves from the initial position to the operation position, the wiping operation of the wiper 6 in a drive mode HIGH is confirmed and is counted.

Firstly, in Step 206, it is checked according to an A/S signal whether the wiper 6 is at the initial position or not.

When the wiper 6 is at the initial position, the processing goes to Step 207, where the second light on/off check portion 9A checks whether the current drive mode Mp obtained in Step 205 is lower in speed than HIGH, that is, is a mode equal to or lower in speed than LOW or not.

When the drive mode Mp is lower in speed than HIGH, in Step 208, the number of times of wiping operations W is set for 0 (zero), and the processing goes to Step 209.

When the drive mode Mp is HIGH, the processing goes directly to Step 209.

In Step 209, the second light on/off check portion 9A resets a past wiper position flag (WIPERposi=0). This stores the fact that the current wiper position exists at the initial position, in preparation for the next flow.

On the other hand, when the check in Step 206 shows that the wiper 6 does not exist at the initial position, that is, when the wiper 6 exists at the operation position, the processing goes to Step 210, where the second light on/off check portion 9A checks whether the past wiper position flag WIPERposi indicating the last-time wiper position is 0 or not.

When WIPERposi=0, since this time is a timing where the wiper 6 moves from the initial position to the operation position, the second light on/off check portion 9A, in Step 211, checks whether the current drive mode Mp is HIGH or not. When it is HIGH, in Step 212, the number of times of wiping operations W is incremented.

Even when this time is a timing where the wiper 6 moves from the initial position to the operation position, unless the drive mode Mp is HIGH, in Step 213, the number of times of wiping operations W is set for 0 (zero).

After execution of Step 212 or 213, in Step 214, the second light on/off check portion 9A, since the wiper 6 is at the operation position this time, sets the past wiper position flag (WIPERposi=1).

Further, also when the check in Step 210 shows that the past wiper position flag is on (WIPERposi=1), in Step 214, there is newly set the past wiper position flag for the next operation.

As described above, when the wiper is operating at the reference drive mode HIGH, the numbers of times of wiping operations are counted consecutively.

After execution of Step 209 or 214, in Step 215, the second light on/off check portion 9A checks whether the number of times of wiping operations W is a given value, for example, three or more or not.

When the number of times of wiping operations W is equal to or larger than a given value, the processing goes to Step 216, where there is set the rain-dependent turn-on flag (FLAGrn=1) and then the processing goes to Step 217.

When the number of times of wiping operations W is less than the given value, while holding the rain-dependent turn-on flag in the last time flow, the processing goes to Step 217.

In Step 217, the second light on/off check portion 9A checks the running scene according to the tunnel flag.

The second light on/off check portion 9A, for FLAGtn1=0, that is, when the vehicle exists within the tunnel, in Step 218, sets the after-tunnel-passage elapsed time Tp for 0 (zero) and, for FLAGtn1=1, that is, when the vehicle exists outside the tunnel, in Step 219, increments the after-tunnel-passage elapsed time Tp.

Here, in the case that the repetition interval of the control flow is 100 msec, the after-tunnel-passage elapsed time Tp may be incremented in each flow, whereby 1/10 of the accumulated value provides the number of seconds.

Here, in an ordinary situation where the vehicle starts to run outside the tunnel, the counting of the after-tunnel-passage elapsed time Tp is started at the time when the ignition key is switched on. Also, when the vehicle goes out from the tunnel, since the after-tunnel-passage elapsed time Tp is set for 0 within the tunnel, the counting of Tp, of course, is started at the time when the vehicle goes out from the tunnel.

And, in Step 220, the second light on/off check portion 9A sets the turn-off prohibition mode Mk according to the value of the after-tunnel-passage elapsed time Tp.

The turn-off prohibition mode Mk is a comparison check reference for the actual drive mode in order that the rain-dependent on/off check is allowed to show "turn-off".

Figure 9:
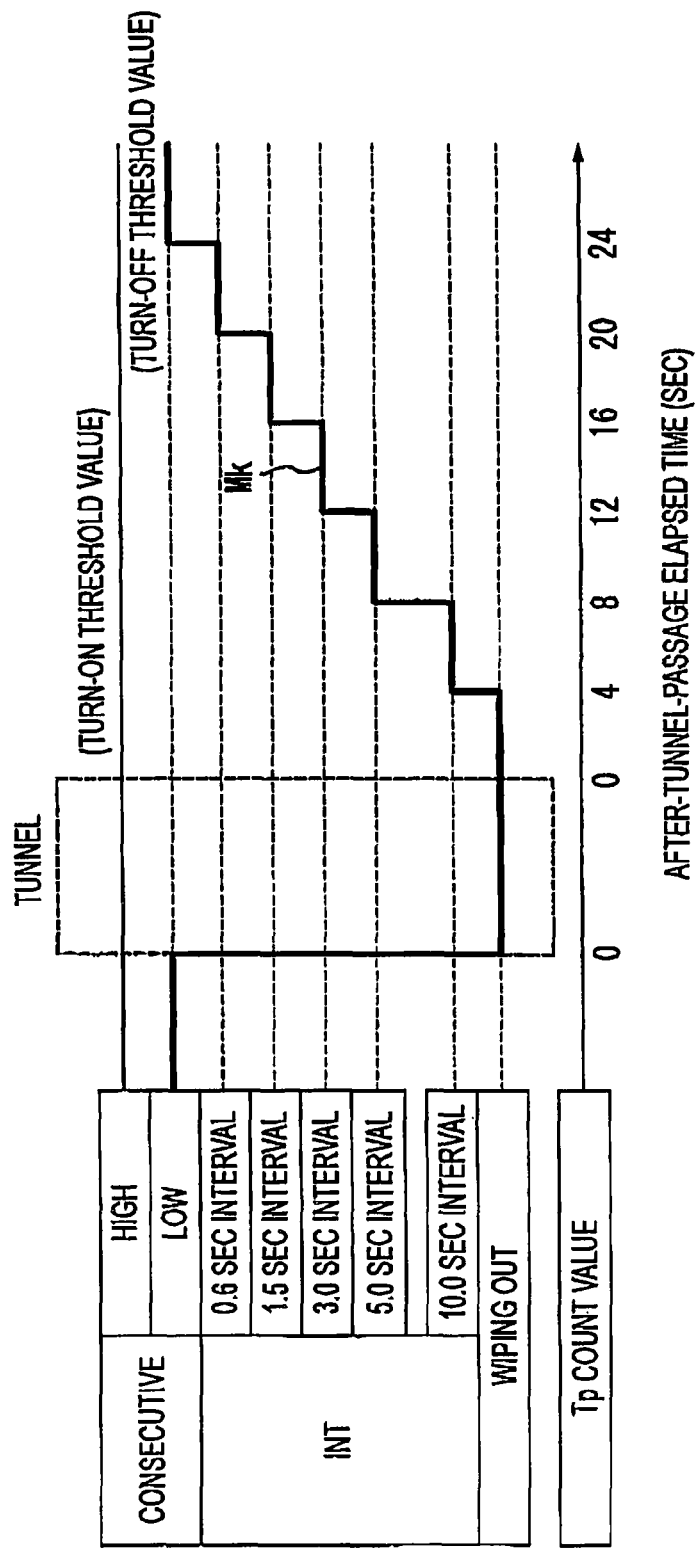
FIG. 9 is a view to show an example of setting a turn-off prohibition mode.

FIG. 9 shows the above-mentioned turn-off prohibition mode Mk which is set according to the elapsed time from the exit of the tunnel.

Here, the basic value outside the tunnel is LOW, just after passage from the tunnel, until the after-tunnel-passage elapsed time Tp reaches 4 sec, the turn-off prohibition mode Mk is set in the wiping stop of the wiper drive mode; from here on, there are provided the turn-off prohibition modes Mk which are set every 4 sec sequentially from the lowest operation speed up to 0.6 sec interval that is the highest speed of INT; and finally, the turn-off prohibition mode Mk is returned to the basic value LOW.

The reason why the turn-off prohibition drive mode is varied according to the elapsed time is as follows. That is, in the transition period just after the vehicle goes out from the tunnel where no rain drops exist, rain drops adhering to the rain drop detect portion of the rain sensor 4 increases with the passage of time and, correspondingly to this, the drive mode varies from the mode of a low operation speed gradually to the mode of a high operation speed which reflects the actual quantity of rain. Therefore, when the drive mode is directly compared with LOW which is a turn-off threshold value in a steady state, there is a fear that the rain-dependent on/off check can show "turn-off" in error. In other words, the reason for the change of the drive mode according to the elapsed time is to prevent such wrong show of "turn-off".

As shown in FIG. 9 together with above-mentioned drive mode, HIGH is a turn-on threshold value according to which the rain-dependent on/off check is made to show "turn-on".

FIG. 9 shows that, at and from 24 sec, the turn-off prohibition mode Mk is fixed to LOW. Thus, after the transition period just after the exit of the tunnel, the "0.6 sec interval" just below LOW provides a turn-off threshold value according to which the rain-dependent on/off check is made to show "turn-off".

After the turn-off prohibition mode Mk is set in any one of the modes respectively different in the intervals from each other, the processing goes to Step 221.

In Step 221, the second light on/off check portion 9A checks whether the current drive mode Mp is a mode lower in speed than the turn-off prohibition mode Mk or not.

While the current drive mode Mp is a mode higher in speed than the turn-off prohibition mode Mk, the processing goes to Step 223.

When the current drive mode Mp is a mode lower in speed than the turn-off prohibition mode Mk, the processing goes to Step 222, where the second light on/off check portion 9A resets the rain-dependent turn-on flag (FLAGrn=0). After then, the processing goes to Step 223.

For the current drive mode Mp, the wiper drive control portion 5 sets one INT mode, or consecutive LOW and HIGH modes in every given range of the level of the rainfall.

Figure 10:
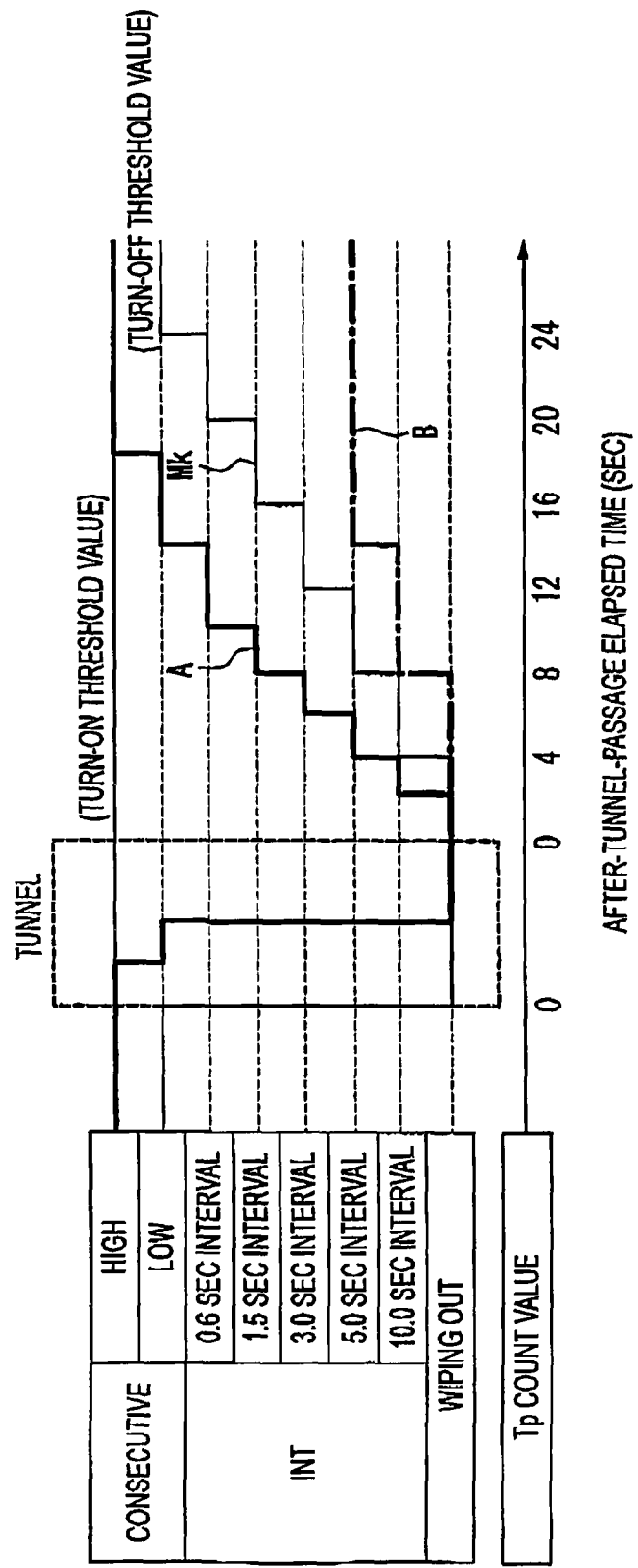
FIG. 10 is a view to show the relationship between the changes of the drive mode before and behind a tunnel exit and the turn-off prohibition mode.

FIG. 10 shows an example of the current drive mode Mp which corresponds to the rainfall state that can be detected by the rain sensor 4, in comparison with the turn-off prohibition mode Mk.

In FIG. 10, reference character A shows the changes of the drive mode Mp in the heavy rain time which requires a HIGH mode before the tunnel and a. HIGH mode also on the tunnel exit side.

In case that the vehicle goes into the tunnel, since no rain drops are detected, the rainfall state detected by the rain sensor 4 is suddenly weakened. As a result of this, within the tunnel, the drive mode MP becomes the wiping stop mode. After then, since, when the vehicle goes out from the tunnel, it is raining heavily outside the tunnel, the rainfall state detected by the rain sensor 4 changes quickly from a zero state toward a strong state.

Therefore, for example, at the time of 4 sec after escape from the tunnel, the turn-off prohibition mode Mk provides an INT mode of a 10-sec interval, whereas the current drive mode Mp provides an INT mode of a 5-sec interval and exists on the high speed side. At the time of 8 sec as well, the turn-off prohibition mode Mk provides an INT mode of a 5-sec interval, whereas the current drive mode Mp provides an INT mode of a 1.5-sec interval and exists on the higher speed side than the turn-off prohibition mode Mk. Therefore, in these cases, the processing goes from Step 221 to Step 223.

In FIG. 10, reference character B shows the changes of the current drive mode MP when the tunnel exit side is not in a heavy rain state. At the time of 4 sec, the turn-off prohibition mode Mk provides an INT mode of a 10-sec interval, whereas the current drive mode Mp provides the wiping stop mode and is lower than the turn-off prohibition mode Mk. Thus, the processing goes to Step 222, where the rain-dependent turn-on flag FLAGrn is reset to 0, and then the processing goes to Step 223.

In Step 223, the light control portion 10, according to the result of the rain-dependent on/off check by the second light on/off check portion 9A, checks the rain-dependent on/off flag.

For FLAGrn=1, the light control portion 10 determines that the rain-dependent on/off check shows "turn-on". Thus, in Step 224, the light control portion 10, regardless of the result of the brightness-dependent on-off check by the first light on/off check portion 3, outputs a light control signal indicating that all head lamps should be turned on.

Owing to this, even in the case that the brightness-dependent on/off check shows no necessity of light turn-on, in a situation where the rainfall state is so heavy as to drive the wiper 6 at the HIGH mode and thus the driving visibility and the like are thereby lowered, the head lamp 12 is turned on automatically. This can facilitate the driving of the vehicle and allows the other vehicle and pedestrians to recognize this vehicle easily.

After then, the processing goes back to Step 201.

In the case that the check in Step 223 shows FLAGrn=0, the light control portion 10 determines that the rain-dependent on/off check shows "turn-off". Thus, in Step 131, the light control portion 10, according to the result of the check made by the first light on/off check portion 3, outputs a control signal indicating that, as shown in FIG. 5, when the brightness-dependent on/off check by the first light on/off check portion 3 shows "turn-off", all lamps should be turned off, when the check shows "small lamp turn-on", the small lamp 13 should be turned on, and when the check shows "head lamp turn-on", the head lamp 12 should be turned on. When the head lamp 12 is turned on, in linking with this, the small lamp may also be turned on.

After then, the processing goes back to Step 201.

According to the above flow, according to Steps 206~208 and 210~213, in the case that the wiper 6 repeats its wiping operation consecutively three times or more in the drive mode HIGH, the light control portion 10 determines that the environment is in a heavy rainfall state, and thus it sets the rain-dependent turn-on flag FLAGrn. While the vehicle does not enter the tunnel but is running in a rain, the turn-off prohibition mode Mk to be set in Step 220 is LOW. While the drive mode Mp is HIGH or LOW, the processing goes from Step 221 directly to Step 223, where the light control portion 10 turns on the head lamp 12 according to FLAGrn=1.

The head lamp 12 to be turned on in the drive mode HIGH is provided with such hysteresis as to continue the turn-on of the head lamp 12 until the drive mode becomes the LOW mode, thereby preventing the head lamp 12 from repeating its turn-on and turn-off for a short time due to slight changes in the rainfall state.

In the case that the vehicle enters a tunnel while it is running with the head lamp 12 on, according to Steps 217 and 218, the after-tunnel-passage elapsed time Tp is held at 0 sec and, in Step 220, the turn-off prohibition mode Mk is set such that Mk=wiping stop.

In the case that the vehicle enters the tunnel and the rain sensor 4 does not detect a rain drop, the drive mode Mp of the wiper 6 also becomes the wiping stop mode, so that Tp and Mk are equal to each other. Therefore, the processing goes from Step 223 to Step 224 while FLAGrn=1 is unchanged, whereby the turn-on of the head lamp 12 is continued. This can prevent the head lamp 12 from being turned off suddenly within the tunnel. Thus, the driver can be prevented from being embarrassed by such sudden turn-off of the head lamp 12.

When the vehicle goes out from inside the tunnel to outside the tunnel, according to the count-up of the after-tunnel-passage elapsed time Tp in Step 219, in Step 220, there is set the turn-off prohibition mode Mk which changes with the passage of time.

And, in Step 221, the current drive mode Mp is compared with the turn-off prohibition mode Mk. In the case that the state of the tunnel exit side has been changed to a small rainfall state and the drive mode Mp is lower in speed than the turn-off prohibition mode Mk, in Step 222, there is reset the rain-dependent turn-on flag FLAGrn to 0, and the processing goes from Step 223 to Step 224.

On the other hand, in the case that the state of the tunnel exit side is also in a heavy rainfall state, the increasing speed of the rain drop adhering to the rain drop detect portion of the rain sensor 4 is fast and the rising of the drive mode Mp corresponding to such increasing speed is also fast. Therefore, the drive mode Mp always exceeds the turn-off probation mode Mk along with the passage of the after-tunnel-passage elapsed time Tp, and the processing goes from Step 223 to Step 225.

In this manner, the "turn-on" of the rain-dependent on/off check within the tunnel can be maintained also after the vehicle goes out from the tunnel, thereby being able to continue the turn-on of the head lamp.

According to the present embodiment, the drive mode HIGH corresponds to a given high-speed-side mode.

The second embodiment is structured in the above-mentioned manner. Similarly to the first embodiment, the second embodiment includes the first light on/off check portion 3 for checking the light on/off according to the brightness of the vehicle running environment, the running scene check portion 8 for checking whether the vehicle running position is within a tunnel or not, the second light on/off check portion 9A for checking the on/off of the light according to the state of a rainfall and the result of the check of the running scene check portion 8, and the light control portion 10 for controlling the on/off of the light 11 according to the result of the check of the first light on/off check portion 3 and the result of the check of the second light on/off check portion 9A. The second light on/off check portion 9A, when the on/off check shows "turn-on" in correspondence to the fall of a rain, maintains the turn-on of the on/off check for a given period of time after the vehicle goes out from the vehicle. The light control portion 10, when the on/off check of the second light on/off check portion 9A shows "turn-off", turns on and off the light 11 (head lamp 12, small lamp 13) according to the result of the check of the first light on/off check portion 3 and, when the on/off check of the second light on/off check portion 9A shows "turn-on", turns on head lamp 12 according to the result of the check of the second light on/off check portion 9A in preference to the result of the check of the first light on/off check portion 3.

According to this structure, when the vehicle goes into a tunnel in a state where the head lamp 12 is on according to the state of a rainfall, the turn-on of the head lamp 12 is continued for a given period of time after the vehicle goes out from the tunnel. This can avoid the visibility difficulty and the like which can otherwise occur until rain drops are detected newly after the vehicle goes out from the tunnel where no rain drops are detected.

Similarly, the running scene check portion 8, especially, utilizing the result of the check of the first light on/off check portion 3, when the check result shows the small lamp turn-on or head lamp turn-on, determines that the vehicle is within the tunnel. Therefore, when compared with a structure in which an exclusive check device is provided separately, the present structure can be simplified and produced at a reduced cost.

Also, the second light on/off check portion 9A obtains the state of a rainfall from the operation state of the wiper 6, that is, when the drive mode of the wiper 6 is the HIGH mode of the highest speed, determines that the rainfall state needs the turn-on of the light. Therefore, the rain sensor 4 can be used in common with an automatic wiper, thereby being able to reduce the cost of the structure. Also, in the case of the HIGH mode, the head lamp 12 is always turned on, which can provide high reliability in operation.

And, a given time, for which the turn-on check is maintained in the second light on/off check portion 9A, is set for the time necessary for the drive mode Mp of the wiper 6 to become a low-speed-side mode lower in speed than the turn-off prohibition mode Mk to be set according to the elapsed time after the vehicle comes out from the tunnel. Therefore, by setting the turn-off prohibition mode Mk properly, when the tunnel exit side is also in a state of heavy rain, the rain-dependent on/off check can be prevented from showing "turn-off". However, for a light rain, the light can be turned off quickly.

Here, according to the present embodiment, the wiper drive control portion 5 decides the wiper drive mode according to the result of the check of the rain sensor. However, the drive mode can also be decided according to the wiper 6 and wiper volume.

Also, according to the first and second embodiments, the running scene check portion 8, according as the brightness-dependent on/off check of the first light on/off check portion 3 is the turn-on of the head lamp or small lamp or not, checks whether the vehicle is running within the tunnel or outside the tunnel. However, the first light on/off check portion 3 may also be structured such that it can operate not only the brightness but also the change ratio of the illumination, and, when the change ratio of the illumination is a given ratio or larger, the running scene check portion 8 may determine immediately that the vehicle has run into the tunnel.

In this case, also when it is relatively bright within the tunnel and thus it takes time for the first light on/off check portion 3 to come into determination that the turn-on of the small lamp or head lamp is necessary, the entrance of the vehicle into the tunnel can be determined quickly.

In the respective embodiments, as the light to be turned on, there illustrated the head lamp 12 and small lamp 13. However, as the need arises, a room lamp and other additional lamps can also be employed as the light to be turned on in the time of a rainfall.

Also, although description has been given heretofore of a case where the tunnel is used as a rain block object, the effect of the invention can also be provided when the vehicle passes through a terminal station including a roof and a ceiling.

The first and second embodiments have been described heretofore separately from each other. However, these two embodiments are different from each other only in the contents of the processings of the second light on/off check portions 9 and 9A. Therefore, there may also be employed a structure which includes a second light on/off check portion having a function to be able to carry out both of the above two processings, and a change-over switch, whereby the control illustrated in the first embodiment and the control illustrated in the second embodiment can be switched over to each other by selecting a driver.

According to the embodiments, in a given rainfall state, the light is turned on to thereby secure a driving visibility and the like and also, in the case that a vehicle runs into a tunnel in a state where the light is on according to the rainfall, the on state of the light still is continued for a given time after the vehicle runs out from the tunnel. This can avoid troubles such as the difficult visibility otherwise possibly occurring, after the vehicle comes out from the tunnel with no rainfall, during the time elapsed from the new detection of a rainfall to the turn-on of the light.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. A vehicle light controller, comprising:
    a first light on/off check portion for checking the on/off of a light according to the brightness of the running environment of a vehicle;
    a running scene check portion for checking whether a running position of the vehicle is within a rain block object or not;
    a second light on/off check portion for checking the on/off of the light according to the state of a rainfall and a result of the check of the running scene check portion; and
    a light control portion for controlling the on/off of the light according to the result of the check of the first light on/off check portion and the result of the check of the second light on/off check portion,
    wherein the second light on/off check portion, only when the result of the check thereof shows the turn-on of the light correspondingly to the rainfall state, maintains the turn-on check result for a given time after the vehicle goes out from the rain block object, and
    wherein the light control portion, when the result of the check of the second light on/off check portion shows the turn-off of the light, turns on and off the light according to the result of the check of the first light on/off check portion, and, when the result of the check of the second light on/off check portion shows the turn-on of the light, turns on the light according to the result of the check of the second light on/off check portion in preference to the result of the check of the first light on/off check portion.

2. The vehicle light controller as set forth in claim 1, wherein the running scene check portion, when the result of the check of the first light on/off check portion shows the turn-on of the light, determines that the vehicle exists within the rain block object.

3. The vehicle light controller as set forth in claim 1, wherein the running scene check portion, when a change ratio of illumination is a given ratio or higher, determines that the vehicle has entered the rain block object.

4. The vehicle light controller as set forth in claim 1, wherein the second light on/off check portion obtains the rainfall state from the operation state of a wiper.

5. The vehicle light controller as set forth in claim 4, wherein the second light on/off check portion, when the number of times of wiping operations of the wiper for a given time provides a given value or larger, determines that the check result shows such rainfall state that requires turning on the light.

6. The vehicle light controller as set forth in claim 4, wherein the second light on/off check portion, when a drive mode of the wiper is a given high speed side mode, determines that the check result shows such rainfall state that requires turning on the light.

7. The vehicle light controller as set forth in claim 6, wherein the given time for maintaining the turn-on check in the second light on/off check portion is a time necessary for the drive mode of the wiper to become a low speed side mode equal to or lower than a turn-off prohibition mode to be set according to the elapsed time after the vehicle goes out from the rain block object.

8. The vehicle light controller as set forth in claim 1, wherein the given time for maintaining the turn-on check in the second light on/off check portion is a time necessary for a wiping stop time of the wiper to exceed a turn-off prohibition time to be set according to an elapsed time after the vehicle goes out from the rain block object.

* * * * *